United States Patent [19]
Mathre

[11] Patent Number: 5,235,890
[45] Date of Patent: Aug. 17, 1993

[54] SCROLL SAW WITH BLINDER

[76] Inventor: David E. Mathre, Rte. 2, Box 24M, Newark, Ill. 60541

[21] Appl. No.: 920,072

[22] Filed: Jul. 27, 1992

[51] Int. Cl.⁵ .............................................. B27B 19/02
[52] U.S. Cl. ........................................ 83/784; 83/545; 83/662
[58] Field of Search .................... 83/781–786, 83/544–546, 662

[56] References Cited

U.S. PATENT DOCUMENTS

| | | | |
|---|---|---|---|
| 1,054,288 | 2/1913 | Fleming | 83/544 X |
| 2,538,456 | 1/1951 | Howe, Jr. | 83/544 X |
| 2,764,189 | 9/1956 | Haydon | 83/783 X |
| 2,870,837 | 1/1959 | Rosenberg | 83/546 X |
| 3,142,321 | 7/1964 | Orescan | 83/544 X |
| 3,848,502 | 11/1974 | O'Neill | 83/544 X |
| 4,204,446 | 5/1980 | Knochel | 83/546 X |
| 4,455,909 | 6/1984 | Wilbs | 83/783 X |
| 4,616,541 | 10/1986 | Eccardt et al. | 83/782 X |
| 5,058,476 | 10/1991 | Legler et al. | 83/782 |

Primary Examiner—Eugenia Jones
Attorney, Agent, or Firm—Ernest Kettelson

[57] ABSTRACT

A scroll saw having a blinder to shield the rapid up and down movement of the saw blade and outer end of the saw blade arm from the view of the operator, comprising a shield member supported at a spaced apart distance in front of the saw blade arm having a vertical dimension large enough to span the vertical movement of the saw blade arm and block the view of such movement from the operator in front thereof. The shield member is supported in such position by a support arm held by a bracket secured to the vertical shaft which connects the hold down shoe to the elongated stationary arm of the scroll saw.

10 Claims, 5 Drawing Sheets

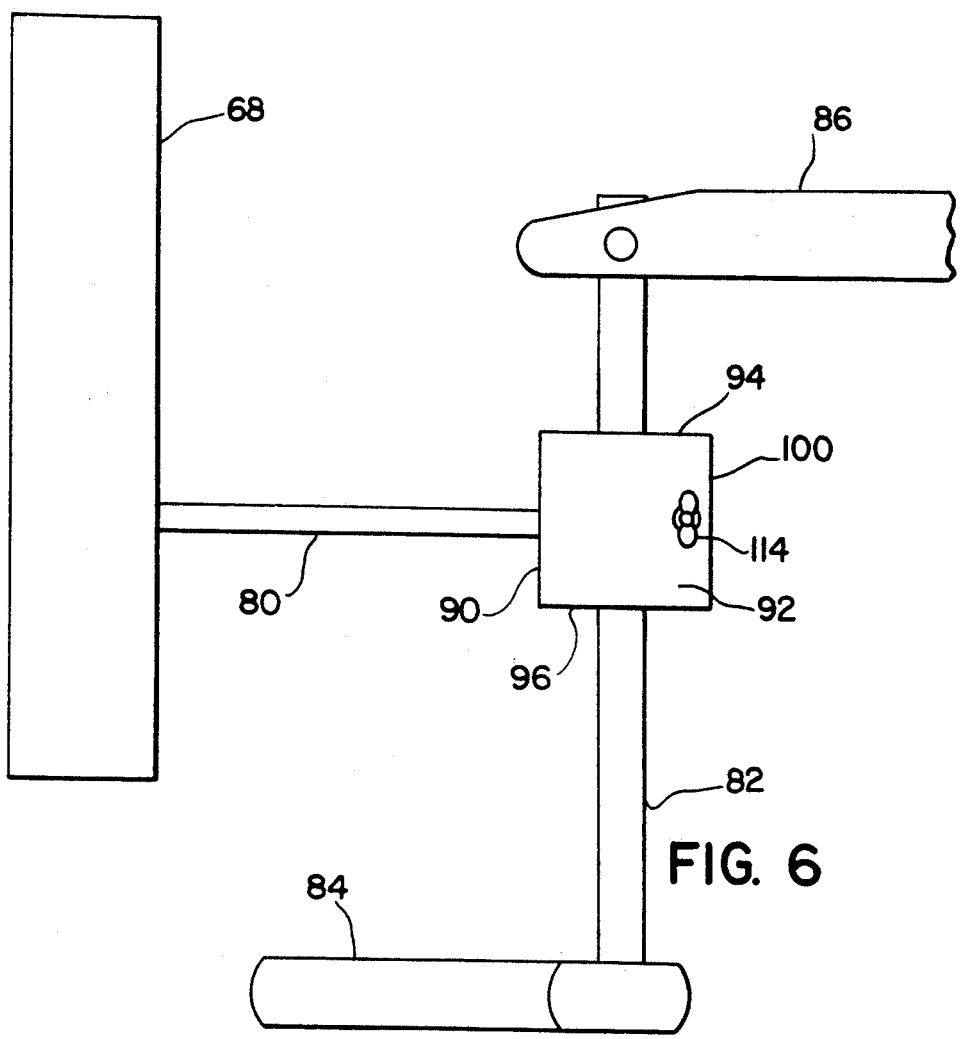
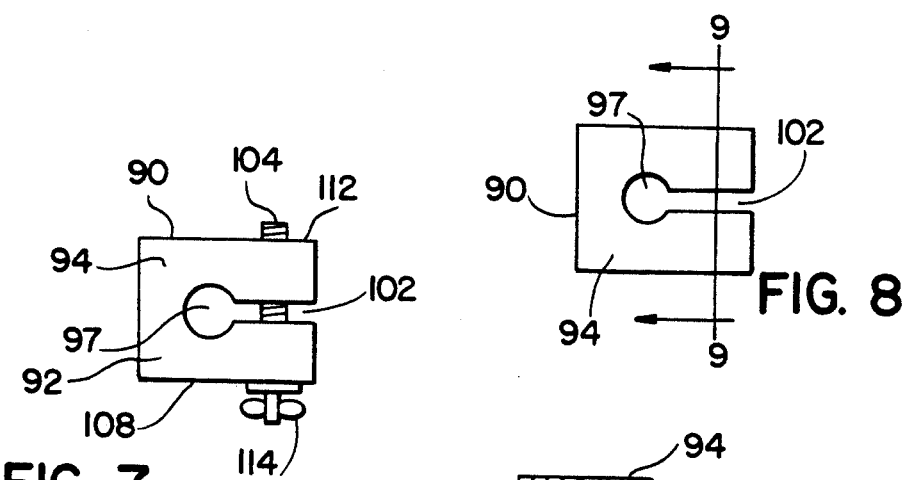
FIG. 6
FIG. 7
FIG. 8
FIG. 9

SCROLL SAW WITH BLINDER

BACKGROUND OF THE INVENTION

This invention relates to the field of scroll saws and a blinder to shield the operator's vision from the rapid up and down movement of the upper saw blade arm.

Prior art devices known to the inventor include those described and shown in the following United States patents:

U.S. Pat. No. 4,616,541 discloses a scroll saw having a blade guard 123 to protect the user of the saw blade from injury and to also hold the workpiece on the table.

U.S. Pat. No. 4,455,909 discloses a hacksaw machine which discloses a pair of spaced apart swinging arms having a hacksaw blade connected between the front ends of the swinging arms, the rearward ends of one or both biased by a draw spring to apply an adjustable tension on the saw blade, the swinging arms being mounted in a U-shaped frame.

U.S. Pat. No. 4,204,446 discloses a power hand saw, comprising a vertically extending saw blade which reciprocates up and down above the work table, in which the operating mechanism is below the work table. A tubular safety shield is mounted above the work table to receive the reciprocating saw blade within its vertical passageway, the front portion of the tubular safety shield being cut away for better visibility of the reciprocating saw blade.

U.S. Pat. No. 2,870,837 discloses a high speed pivoted cutting machine for use in repairing shoes, having a reciprocating blade and a protective guard which covers the blade but not the outer end of the upper arm. The guard is to protect the hand and fingers of the operator from coming in contact with the blade.

U.S. Pat. No. 2,764,189 discloses a power saw having a saw blade which extends above the work table and reciprocates up and down in the vertical direction, the operating mechanism being below the work table. A guard is provided above the work table to protect the hands and fingers of the operator from contact with the blade.

U.S. Pat. No. 2,350,247 discloses a machinery guard to protect the hands and fingers of a workman from contact with a reciprocating blade or tool.

U.S. Pat. No. 1,447,987 discloses a safety guard for presses, such as a metal stamping press, which encloses the work piece but which is of transparent or mesh material so the workman can see through the guard to observe operation of the press arm and stamping head as it contacts and presses against the work piece.

U.S. Pat. No. 1,102,544 discloses an embroidery trimming machine having a guide to prevent the cutter from cutting too close to the embroidery and also prevents movement of the embroidery too far under the guide.

The improved scroll saw with a blinder in accordance with this invention solves a problem which none of the prior art guard devices address, namely the visual distraction and tiring effect of having the continuous up and down movement of the outer end of the upper saw blade arm in the field of vision of the operator. The blinder in accordance with this invention includes a shield which is positioned in front of the outer end of the upper saw blade arm, having a vertical dimension long enough to span the distance the outer end of the upper saw blade arm travels upwardly and downwardly during operation of the reciprocating saw blade.

The blinder shield is held stationary by mounting it to a non-movable part of the scroll saw frame, such as the horizontally extending hold down arm to which the vertical shaft of the hold down foot assembly is connected, or to the vertical shaft of the hold down foot assembly itself.

The blinder shield is preferably arcuate in shape, having a convex surface facing outwardly and away from the outer end of the upper saw blade arm and a concave surface facing inwardly and toward the outer end of the upper saw blade arm. The blinder shield curves around to block the operator's field of vision on each side of the outer end of the upper saw blade arm as it moves up and down during operation of the reciprocating saw blade.

SUMMARY OF THE INVENTION

It is an object of the invention to provide a scroll saw with a blinder to block the movable outer end of the upper saw blade arm from the field of vision of the operator of the scroll saw to prevent the visual distraction and tiring effect which occurs when up and down movement of the outer end of the upper saw blade arm is continuously viewed by the operator in his peripheral vision as he continuously keeps his eyes focused on the work piece itself in cutting engagement with the saw blade.

It is an object of the invention to provide a scroll saw with a blinder to block the movement of the outer end of the upper sa blade arm from the field of vision of the scroll saw operator, wherein the blinder includes a shield which is positioned in front of the movable outer end of the upper saw blade arm and a supporting member to support the shield in such position, the supporting member being secured to a non-movable portion of the scroll saw assembly.

BRIEF DESCRIPTION OF THE DRAWING

FIG. 6 is a side elevation view of the blinder in accordance with this invention shown connected to the vertical shaft of the hold down member by a compression bracket.

FIG. 7 is a top plan view of the compression bracket with its tightening bolt in place FIG. 8 is a top plan view of the compression bracket with its tightening bolt removed.

FIG. 9 is a section view taken on line 9—9 of FIG. 8.

DESCRIPTION OF PREFERRED EMBODIMENT

Figure 1:
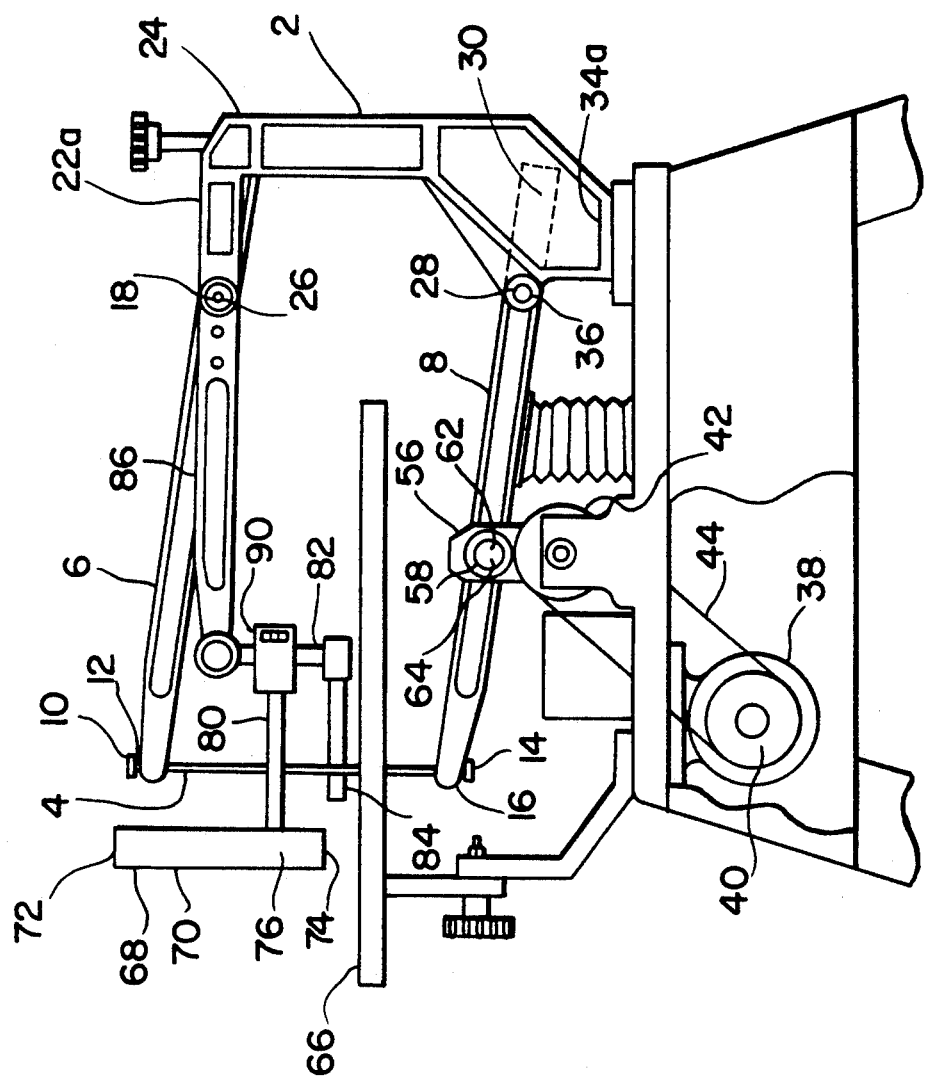
FIG. 1 is a side elevation view of a scroll saw with a blinder in accordance with this invention
Figure 2:
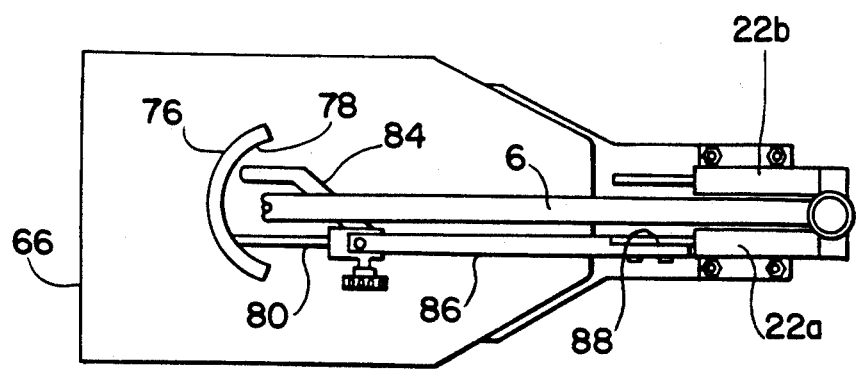
FIG. 2 is a top plan view of the scroll saw and blinder of FIG. 1.
Figure 3:
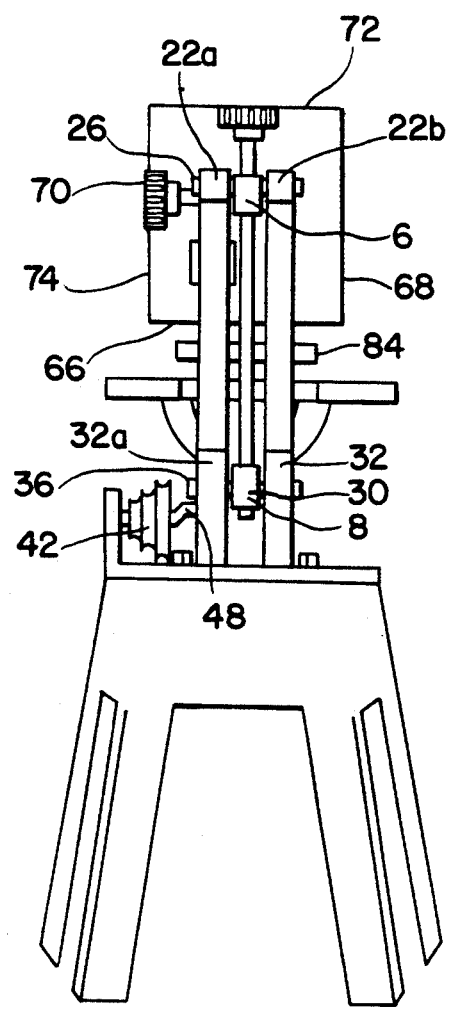
FIG. 3 is an elevation view from the rear of the scroll saw and blinder of FIG. 1.
Figure 4:
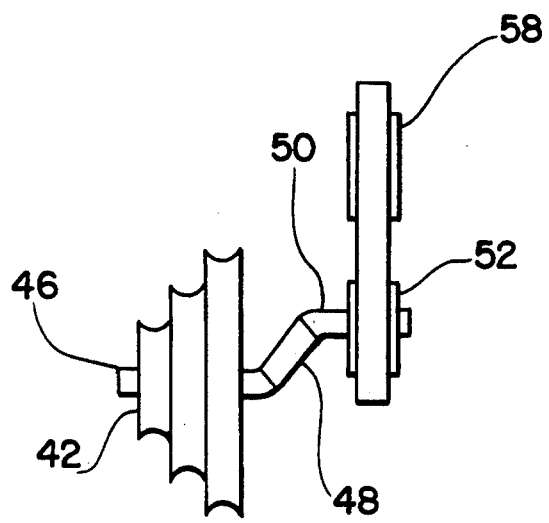
FIG. 4 is an end elevation view of the machine pulley and eccentric drive shaft to operate the drive link member and lower walking beam arm connected thereto.
Figure 5:
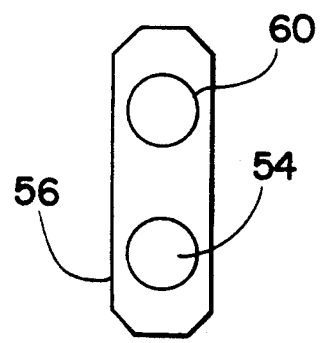
FIG. 5 is a side elevation view of the drive link member.
Figure 10:
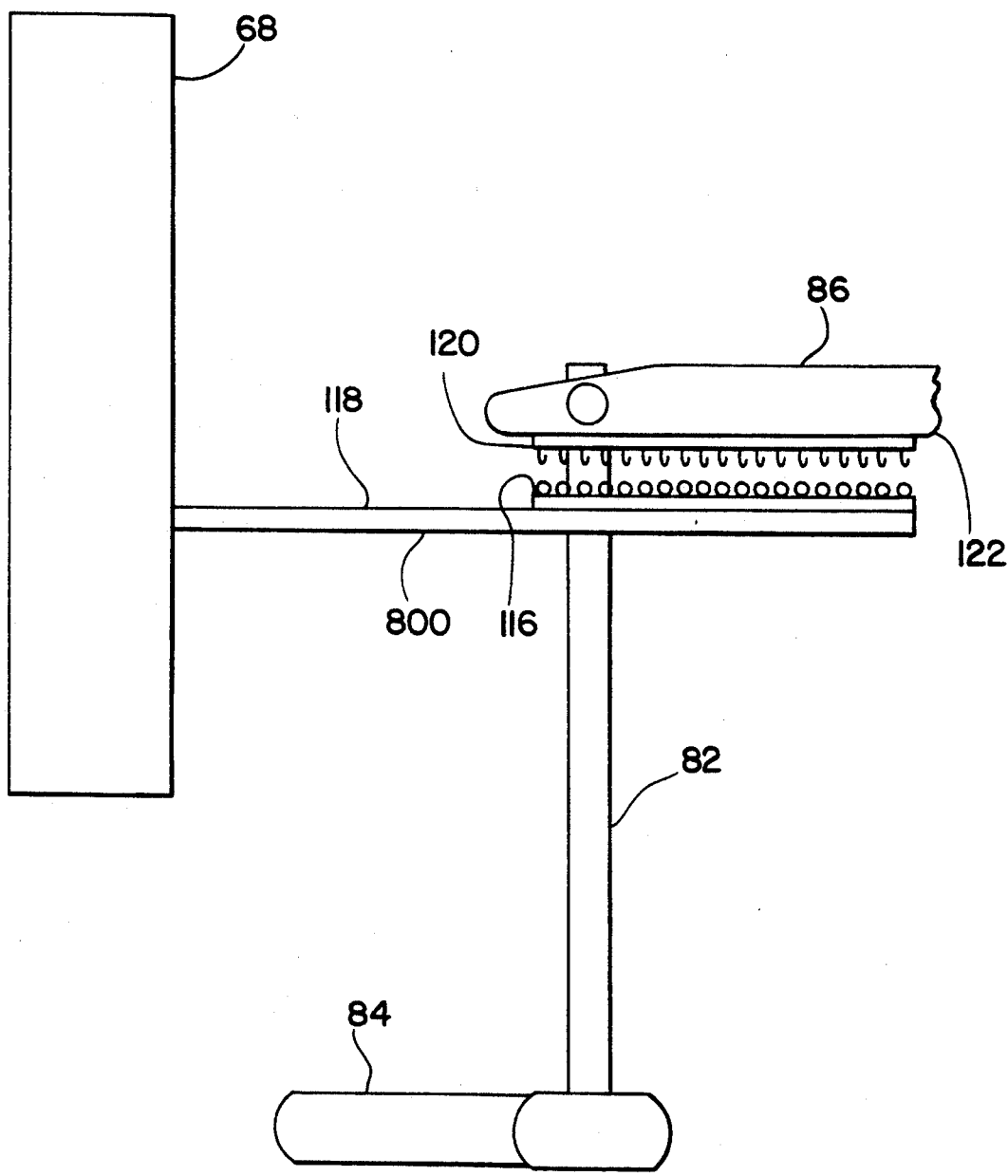
FIG. 10 is a side elevation view of the blinder in accordance with this invention showing a modified connecting arm to secure the blinder to a stationary member of the scroll saw.

A scroll saw and blinder combination in accordance with the present invention comprises a scroll saw 2 having a pair of spaced apart reciprocating arms which hold the scroll saw blade 4 therebetween for reciprocating movement, including an upper walking beam member 6 and a lower walking beam member 8.

The upper walking beam member 6 has an upper blade holder 10 at its forward free end to receive and hold the upper end 12 of the saw blade 4. The lower walking beam member 8 has a lower blade holder 14 at its forward free end to receive and hold the lower end 16 of the saw blade 4.

The upper walking beam member 6 is pivotally mounted at a pivot point 18, which is inwardly of the upper walking beam member 6 and forwardly from its rearward free end 20, to and sandwiched between the pair of horizontally extending spaced apart upper legs 22a and 22b of the scroll saw frame 24 by a pivot pin 26.

The lower walking beam member 8 is pivotally mounted at a pivot point 28, which is inwardly of the lower walking beam member 8 and forwardly from its rearward free end 30, to and sandwiched between the pair of horizontally extending spaced apart lower legs 32a and 32b of the scroll saw frame 24 by a pivot pin 36.

The forward free ends of the upper and lower walking beam members 6 and 8, and the scroll saw blade 4 held therebetween, are reciprocated up and down by an electric motor 38 having a drive pulley 40 connected to drive machine pulley 42 by a drive belt 44. An eccentric drive shaft 46 is connected to the machine pulley 42 for rotation therewith. The eccentric drive shaft 46 includes a diagonally extending section 48 and an offset drive lug 50 received in the central aperture of a first roller bearing 52 secured in the lower recess 54 of a drive link member 56.

The drive link member 56 has a second roller bearing 58 secured in the upper recess 60 of drive link member 56. The lower walking beam member 8 is connected to the drive link member 56 at a drive connecting point 62 inwardly of the lower walking beam member 8 and rearwardly from its forward free end, by a drive pin 64 extending laterally therefrom and received in the central aperture of the second roller bearing 58 in the upper recess 60 of the drive link member 56.

The drive pulley 40 of the motor 38 rotates the machine pulley 42 and eccentric drive shaft 46, whose offset drive lug 50 rotates in an offset or outer orbit around the central axis of the drive shaft 46 and machine pulley 42. As the drive lug 50 rotates in such offset or outer orbit, it moves the drive link member 56 and its second roller bearing 58 in its upper recess 60 upwardly and downwardly. The lower walking beam member 8, whose drive pin 64 is received in the central aperture of the second roller bearing 58, is thereby moved upwardly and downwardly to also reciprocate the saw blade 4 connected to the forward free end of lower walking beam member 8 upwardly and downwardly as well as causing the forward free end of the upper walking beam member 6 to which the upper end of the saw blade 4 is connected to also move upwardly and downwardly.

The upper and lower walking beam members 6 and 8 and saw blade 4 held therebetween are reciprocated upwardly and downwardly at a rapid rate. A workman who is working with a workpiece on the work table 66 in cutting engagement with the scroll saw has the rapidly moving forward end of the upper walking beam member 6 constantly in his field of vision. Such rapid up and down movement of the forward end of the upper walking beam member 6 is not only a distraction for the workman but it becomes a tiring annoyance, it can cause dizziness as well as fatigue and may even approach the level of having a hypnotic effect on some workmen.

To eliminate this problem, a stationary blinder 68 is positioned forwardly of the rapidly moving forward free end of the upper walking beam member 6 which blocks such rapid up and down motion of the forward free end of the upper beam member 6 from the workman's view.

The blinder 68 comprises a shield member 70 having an imperforate blinder wall with a vertical or longitudinal dimension greater than the travel distance of the forward free end of the upper walking beam member 6 as it is moved upwardly end downwardly by the drive mechanism and connections described above. The vertical or longitudinal dimension of the shield member 70 is preferably about six inches and positioned relative to the forward free end of the upper walking beam member 6 so the upper edge 72 of the shield member 70 is above the uppermost distance the forward free end of the upper beam member 6 travels in its up and down movement, and so the lower edge 74 of the shield member 70 is below the lowermost distance the forward free end of the upper beam member 6 travels in its up and down movement.

The shield member 70 has a horizontal or lateral dimension greater than the width of the forward free end of the upper beam member 6 and preferably three times its width or more. The horizontal or lateral dimension of the shield member 70 is preferably about three inches or wider.

The shield member 70 may have planar front and rear surfaces, or in a preferred embodiment the front and rear surfaces are curved or arcuate, the front or forwardly facing surface 76 being convex and the rear or rearwardly facing surface 78 which faces the forward free end of the upper walking beam member 6 being concave. The arcuate front and rear surfaces 76 and 78 extend in arcuate paths which surround the vertical or up and down travel path of the saw blade 4 and of the forward free end of the upper beam member 6.

The shield member 70 is held in the position as described by a horizontally extending support arm 80 bolted or welded at its forward end to the rear surface 78 of the shield member 70, the rearward end of the horizontal support arm 80 being secured to the vertical shaft 82 of the hold down foot 84 which holds the work piece to the work table 66 and keeps it from jumping as it is being cut by the scroll saw blade 4.

The vertical shaft 82 of the hold down foot 84 is secured to the forward end of the horizontally extending hold down arm 86 whose rearward end is bolted to the outwardly facing side 88 of the forward end of the upper horizontal leg 22a of the scroll saw frame 24. The horizontally extending hold down arm 86 is held in fixed position and it extends forwardly alongside the movable upper walking beam member 6. Throughout its movement upwardly and downwardly from its pivotal connection between the upper legs 22a and 22b of the scroll saw frame 24, the upper walking beam member 6 rises above and descends below the fixed level of the horizontally extending hold down arm 86 a substantially equal distance in each direction.

The rearward end of horizontal support arm 80 which holds the shield member 70 in place may be secured to the vertical shaft 82 of the hold down foot 84 in a number of different ways.

In one embodiment, a compression bracket 90 is provided comprising a body portion 92 having a top wall 94, a bottom wall 96, a closed forwardly facing end wall 98 and a rearwardly facing end wall 100 with a spread apart slot 102 opening thereto extending from the top wall 94 to the bottom wall 96 and extending inwardly of the body portion 92 to open to a vertically extending cylindrical recess 97 which opens at one end to the top wall 94 and at its opposite end to the bottom wall 96 of the compression bracket 90.

The compression bracket 90 is secured to the rearward end of the horizontal support arm 80 of the shield member 70 by threading it into an internally threaded aperture of the compression bracket 90 opening to the forwardly facing end wall 98. The compression bracket 90 is secured to the vertical shaft 82 of the hold down foot 84 by extending the vertical shaft 82 through the cylindrical recess 97 of the compression bracket 90. A bolt 104 extends through an unthreaded oversize aperture 106 in the body portion 92 of the compression bracket 90 which extends from its side wall 108 and opens to the spread apart slot 102, the bolt 104 having its outer end portion threaded and received in an internally threaded aperture 110 which extends from the slot 102 through the body portion 92 on the opposite side of the slot from aperture 106, coaxial with aperture 106, and opening to the opposite side wall 112 of the body portion 92 of the compression bracket 90.

The bolt 104 has a hand grasp knob 114 on its opposite end for rotating the bolt 104. The inwardly facing surface of the knob 114 bears against the surface of the side wall 108. When the knob 114 is rotated in one direction, its threaded end draws the portion of the body portion 92 of the compression bracket 90 through which the threaded aperture 110 extends toward the portion through which the unthreaded aperture 106 extends, thus narrowing the spread apart slot 102 and thus constricting the cylindrical recess 97.

The vertical shaft 82 of the hold down foot 84 is received in the cylindrical recess 97 of the compression bracket 90 to secure the support arm 80 of the shield member 70 to the vertical shaft 82 of hold down foot 84. The diameter of the cylindrical recess 97 before being constricted by tightening rotation of the bolt 104 corresponds to the diameter of the vertical shaft 8 of the hold down foot 84, and is slightly larger to receive the shaft 82 therein. When cylindrical recess 97 is constricted by rotating bolt 104 in the tightening direction, the shaft 82 is gripped tightly therein to hold the support arm 80 of the shield member 70 securely in place.

In another embodiment, the support arm 80 of the shield member 70 is secured directly to the horizontally extending hold down arm 86 by a cooperative pair of fastening strips having releasable interconnecting means thereon, such as the loop surface strip 116 secured to the upwardly facing flat top wall 118 of a modified support arm 800 which is flat or planar and the hook surface strip 120 secured to the downwardly facing flat bottom wall 122 of the hold down arm 86.

The loop surface strip 116 includes a plurality of tiny loop members 124 projecting from its outwardly facing surface. The hook surface strip 120 includes a plurality of tiny hook members 126 projecting from its outwardly facing surface to hook and releasably interconnect with the corresponding plurality of tiny loop members 124 of the strip 116 when brought into facing engagement therewith.

I claim:

1. A saw and blinder combination, comprising a power driven saw, said power driven saw including work piece support means to support a work piece to be sawed, a saw blade positioned and held for cutting engagement with a said work piece on said work piece support means and for reciprocating movement while in said cutting engagement with a said work piece on said work piece support means, movable saw blade securing means to hold and reciprocate said saw blade, said movable saw blade securing means including a movable upper arm having a saw blade connecting free end positioned above said work piece support means, saw blade connecting means to connect an upper end portion of said saw blade to said saw blade connecting free end of said movable upper arm, said saw blade connecting free end being movable a predetermined limited distance upwardly and away from and downwardly toward said work piece support means, a blinder comprising a shield member having a distal end edge most remote from said work piece support means and a proximal end edge nearest said work piece support means and having a longitudinal dimension between said distal and proximal end edges slightly greater than said predetermined limited distance said saw blade connecting free end moves upwardly away from and downwardly toward said work piece support means, said shield member having a first side edge, an opposite second side edge, a midpoint centered between said first and second side edges, and an imperforate blinder wall extending laterally from said midpoint toward each of said first and second side edges of said shield member, and blinder support means to hold said shield member at a positioned spaced apart outwardly from said saw blade connecting free end of said movable upper arm and with said distal end edge of said shield member positioned beyond the farthest point said saw blade connecting free end moves in said direction upwardly and away from said work piece support means, said proximal end edge of said shield member positioned beyond the farthest point said saw blade connecting free end moves in said direction downwardly and toward said work piece support means.

2. A saw and blinder combination as set forth in claim 1, wherein said imperforate blinder wall of said shield member comprises an arcuate wall, a concave surface thereof facing rearwardly in the direction toward said saw blade and said saw blade connecting free end of said movable upper arm, and a convex surface facing forwardly in the opposite direction.

3. A saw and blinder combination as set forth in claim 1, wherein said longitudinal dimension of said shield member between said distal and proximal end edges is at least six inches.

4. A saw and blinder combination as set forth in claim 1, wherein the lateral dimension of said shield member between said opposite side edges is at least three inches.

5. A saw and blinder combination comprising a power driven saw, said power driven saw including work piece support means to support a work piece to be sawed, a saw blade positioned and held for cutting engagement with a said work piece on said work piece support means and for reciprocating movement while in said cutting engagement with a said work piece on said work piece support means, movable saw blade securing means to hold and reciprocate said saw blade, said movable saw blade securing means including a movable upper arm having a saw blade connecting free end positioned above said work piece support means, saw blade connecting means to connect an upper end portion of said saw blade to said saw blade connecting free end of said movable upper arm, said saw blade connecting free end being movable a predetermined limited distance upwardly and away from and downwardly toward said work piece support means, a blinder comprising a shield member having a distal end edge most remote from said work piece support means and a proximal end edge nearest said work piece support means and having a longitudinal dimension between said distal and proximal end edges slightly greater than said predetermined limited distance said saw blade connecting free end moves upwardly away from and downwardly toward said work piece support means, and blinder support means to hold said shield member at a position spaced apart outwardly from said saw blade connecting free end of said movable upper arm and with said distal end edge of said shield member positioned beyond the farthest point said saw blade connecting free end moves in said direction upwardly and away from said work piece support means, said proximal end edge of said shield member positioned beyond the farthest point said saw blade connecting free end moves in said direction downwardly and toward said work piece support means, wherein said power driven saw includes a horizontally extending member extending in the direction toward said saw blade connecting free end of said movable upper arm and positioned above said work piece support means, said blinder support means includes a horizontally extending blinder support arm, one end of said blinder support arm being secured to said shield member, the opposite end of said blinder support arm being secured to said horizontally extending member of said power driven saw, and blinder support arm connecting means to secure said opposite end of said blinder support arm to said horizontally extending member of said power driven saw.

6. A saw and blinder combination as set forth in claim 5, wherein said power driven saw includes a hold down assembly to hold a said work piece to said work piece support means, said hold down assembly including a hold down member, a vertically extending hold down shaft, one end of said vertically extending hold down shaft being secured to said hold down member, the opposite end of said vertically extending hold down shaft being secured to said horizontally extending member of said power driven saw, said blinder support arm connecting means including said vertically extending hold down shaft, and bracket means to secure said opposite end of said blinder support arm to said vertically extending hold down shaft.

7. A saw and blinder combination as set forth in claim 6, wherein said bracket means comprises a compression bracket member, said compression bracket member having a top wall, a bottom wall, a rearwardly facing end wall, a forwardly facing end wall, a first side wall facing in one direction and a second side wall facing in the opposite direction, a constrictable cylindrical bore extending through said compression bracket member opening at one end to said top wall and at the opposite end to said bottom wall, a spread apart slot extending from said top wall of said compression bracket member to said bottom wall thereof opening to said rearwardly facing end wall at one end of said slot and opening to said constrictable cylindrical bore at the opposite end of said slot, a first compressible web portion of said compression bracket member along one side of said slot extending to said first side wall, a second compressible web portion of said compression bracket member along the opposite side of said slot extending to said second side wall, an internally threaded cylindrical bore in said first compressible web portion opening to said slot and extending toward said first side wall, an enlarged cylindrical bore in said second compressible web portion opening to said slot at one end and to said second side wall at its opposite end, said enlarged cylindrical bore being coaxial with said internally threaded bore, a bolt having an outer free end, a threaded portion having external threads extending inwardly from said outer free end extending through said enlarged cylindrical bore with said externally threaded portion threadedly received in said internally threaded bore, a knob on said bolt at its end opposite said outer free end, a bearing surface of said bolt between said knob and said second side of said compression bracket member, said blinder support arm being secured to said forwardly facing end wall of said compression bracket member, said vertically extending hold down shaft of said hold down assembly of said power driven saw being received in said constrictable cylindrical bore of said compression bracket member, said vertically extending hold down shaft being gripped and secured held when said constrictable cylindrical bore is constricted by rotating said bolt in the direction which draws said first compressible web portion toward said second compressible web portion narrowing said spread apart slot and constricting said constrictable cylindrical bore.

8. A saw and blinder combination as set forth in claim 5, wherein said blinder support arm connecting means comprises a pair of cooperative interconnecting members, including a first cooperative interconnecting member secured to said blinder support arm having first cooperative interconnecting means thereon and a second cooperative interconnecting member secured to said horizontally extending member of said power driven saw having second cooperative interconnecting means thereon.

9. A saw and blinder combination as set forth in claim 8, wherein said first cooperative interconnecting member comprises a first elongated strip, said first cooperative interconnecting means thereon comprises a plurality of tiny loop members, said second cooperative interconnecting member comprises a second elongated strip, said second cooperative interconnecting means thereon comprises a plurality of tiny hook member for releasable interconnection with said plurality of tiny loop members when brought into facing engagement therewith.

10. A saw and blinder combination as set forth in claim 8, wherein said first cooperative interconnecting member comprises a first elongated strip, said first cooperative interconnecting means thereon comprises a plurality of tiny hook members, said second cooperative interconnecting member comprises a second elongated strip, said second cooperative interconnecting means thereon comprises a plurality of tiny loop members for releasable interconnection with said plurality of tiny hook members when brought into facing engagement therewith.

* * * * *